United States Patent
Heyl et al.

(10) Patent No.: US 11,577,753 B2
(45) Date of Patent: Feb. 14, 2023

(54) SAFETY ARCHITECTURE FOR CONTROL OF AUTONOMOUS VEHICLE

(71) Applicant: Robert Bosch GmbH, Stuttgart (DE)

(72) Inventors: Andreas Heyl, Sunnyvale, CA (US); Thomas Benjamin Gussner, Ludwigsburg (DE); Theresa Veronika Kienle, Stuttgart (DE); Stephan Reuter, Elchingen (DE); Oliver F. Schwindt, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 345 days.

(21) Appl. No.: 16/874,327

(22) Filed: May 14, 2020

(65) Prior Publication Data

US 2020/0377122 A1    Dec. 3, 2020

Related U.S. Application Data

(60) Provisional application No. 62/854,663, filed on May 30, 2019.

(51) Int. Cl.
| | |
|---|---|
| *B60W 60/00* | (2020.01) |
| *B60W 10/04* | (2006.01) |
| *B60W 10/18* | (2012.01) |
| *B60W 10/20* | (2006.01) |

(52) U.S. Cl.
CPC ........ *B60W 60/0025* (2020.02); *B60W 10/04* (2013.01); *B60W 10/18* (2013.01); *B60W 10/20* (2013.01)

(58) Field of Classification Search
CPC .. B60W 60/0025; B60W 10/04; B60W 10/18; B60W 10/20; B60W 50/02; B60W 60/0016; B60W 2420/40; B60W 2420/42; B60W 2420/52; B60W 2420/54; B60W 2710/18; B60W 2710/20
See application file for complete search history.

(56) References Cited

U.S. PATENT DOCUMENTS

| | | | |
|---|---|---|---|
| 6,028,550 A | 2/2000 | Froeberg et al. | |
| 7,409,295 B2 | 8/2008 | Paradie | |
| 9,779,624 B2 | 10/2017 | Lefevre et al. | |
| 2018/0067490 A1 | 3/2018 | Pollach et al. | |
| 2018/0089538 A1 | 3/2018 | Graham et al. | |
| 2018/0217603 A1 | 8/2018 | Kwon et al. | |
| 2019/0092341 A1* | 3/2019 | Stark | B60W 10/04 |

FOREIGN PATENT DOCUMENTS

DE    102016212195 A1    1/2018

* cited by examiner

*Primary Examiner* — Alan D Hutchinson
(74) *Attorney, Agent, or Firm* — Michael Best & Friedrich LLP

(57) ABSTRACT

Methods and systems for controlling an autonomous vehicle. The method includes receiving sensor data from a plurality of sensors, determining, a plurality of probability hypotheses based upon the sensor data, and receiving metadata from at least one sensor of the plurality of sensors. An integrity level of at least one of the plurality of probability hypotheses is determined based upon the received metadata and at least one action is determined based upon the determined integrity level and at least one probability hypothesis of the plurality of probability hypotheses. The at least one action is then initiated by an electronic controller for the vehicle.

20 Claims, 3 Drawing Sheets

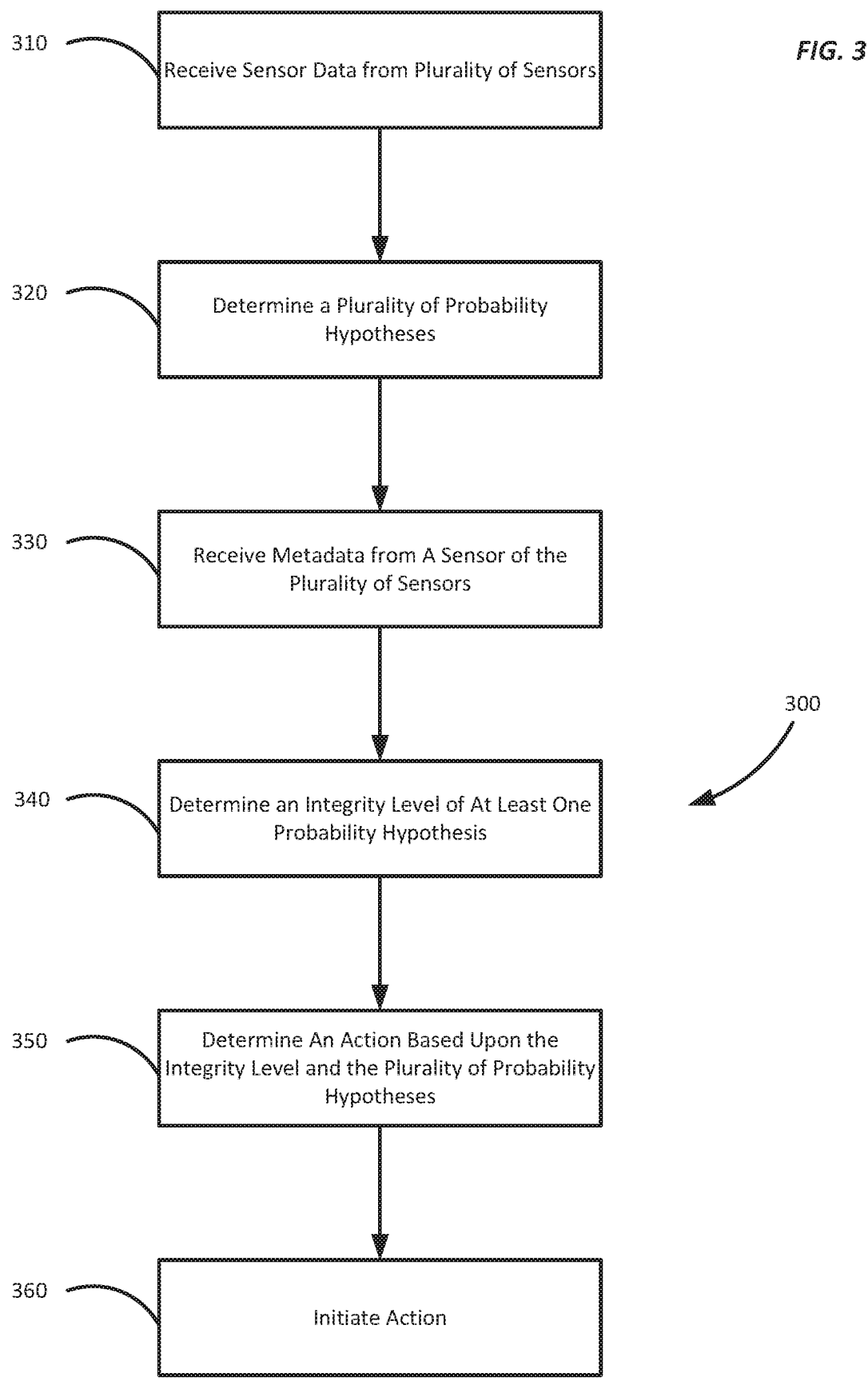

SAFETY ARCHITECTURE FOR CONTROL OF AUTONOMOUS VEHICLE

CROSS-REFERENCE TO RELATED APPLICATIONS

This application claims priority to U.S. Provisional Patent Application No. 62/854,663, filed May 30, 2019, the content of which is incorporated by reference in its entirety.

BACKGROUND

Current automated driving systems ("ADS") utilize complex sensor data inputs and processing algorithms to control automated vehicles. Some sensors, sensor modalities, and other data sources, such as digital maps, can measure or provide only certain aspects of the driving environment. For example, speed measurements made using radar sensors are, in general, very accurate. In contrast, speed measurements made using video are less accurate. However, video can be used to identify particular objects in the driving environment. Object identification (as opposed to simple presence detection) using radar sensors is, while possible, not as reliable, accurate, or precise as using video or other sensors.

To help address some of these limitations, the fusion of data from multiple sensors, sensor modalities, and other data sources is often performed to obtain a fuller representation of the driving environment. However, sensors and other safety systems can provide incorrect measurements or data due to systematic limitations and/or systematic or random internal faults with the sensors. To help account for some of these shortcomings, the gathering of sensor data and the processing of the sensor data is based upon probabilistic algorithms. However, using probabilistic algorithms may lead to incorrect classification of objects or dangers, incorrect tracking of objects, missed detection of objects, the detection of "ghost" objects (objects that are "detected" that are not actually present in the driving environment), incorrect target selection, and incorrect kinematic estimation of objects (for example, a speed of an object is incorrectly calculated). Current control algorithms derive discrete control decisions, such as accelerating or decelerating, based upon these probabilistic inputs.

SUMMARY

A control system is needed to better process these probabilistic inputs and generate a control solution based upon the various probabilistic hypotheses generated based upon the data fusion of the multiple sensors. Some embodiments provide a control system that generates multiple probabilistic hypotheses, which are saved in a memory until a processing step determines which hypothesis will be used to actuate vehicle systems. These hypotheses are used to support the selection of a final hypothesis and to select a vehicle control to achieve or enhance safety of the intended functionality ("SOTIF"). Additionally, the control system utilizes information about the data sources, such as information regarding operation of the sensors, in order to prevent or reduce the possibility of sensors that are failing or providing incorrect information from affecting a probabilistic determination and resulting control operation.

Broadly, embodiments described herein are related to a control system for controlling an autonomous or partially autonomous vehicle (sometimes referred to simply as an "autonomous" vehicle).

One embodiment provides a method for controlling an autonomous vehicle. The method includes receiving sensor data from a plurality of sensors, determining a plurality of probability hypotheses based upon the sensor data, and receiving metadata from at least one sensor of the plurality of sensors. An integrity level of at least one of the plurality of probability hypotheses is determined based upon the received metadata and at least one action is determined based upon the determined integrity level and at least one probability hypothesis of the plurality of probability hypotheses. The at least one action is then initiated by an electronic controller or similar device of the vehicle.

Another embodiment provides a method for controlling an autonomous vehicle. The method includes receiving, with an electronic processor, sensor data from a plurality of sensors; determining, with the electronic processor, a plurality of probability hypotheses based upon the sensor data; and receiving, with the electronic processor, metadata from at least one sensor of the plurality of sensors. An integrity level of at least one of the plurality of probability hypotheses is determined based upon the received metadata. The method also includes determining, with the electronic processor, at least one action based upon the determined integrity level and at least one probability hypothesis of the plurality of probability hypotheses; and initiating, with the electronic processor, the at least one action.

Other aspects, features, and embodiments will become apparent by consideration of the detailed description and accompanying drawings.

BRIEF DESCRIPTION OF THE DRAWINGS

FIG. 3 illustrates a method of controlling an autonomous vehicle according to one embodiment.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software-based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable media) executable by one or more electronic controllers or electronic processors. For example, "controllers" described in the specification can include one or more electronic processors, one or more memories including non-transitory computer-readable media, one or more input/output interfaces, one or more application specific integrated circuits (ASICs) and other circuits, and various connections (for example, wires, printed traces, and busses) connecting the various components.

It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
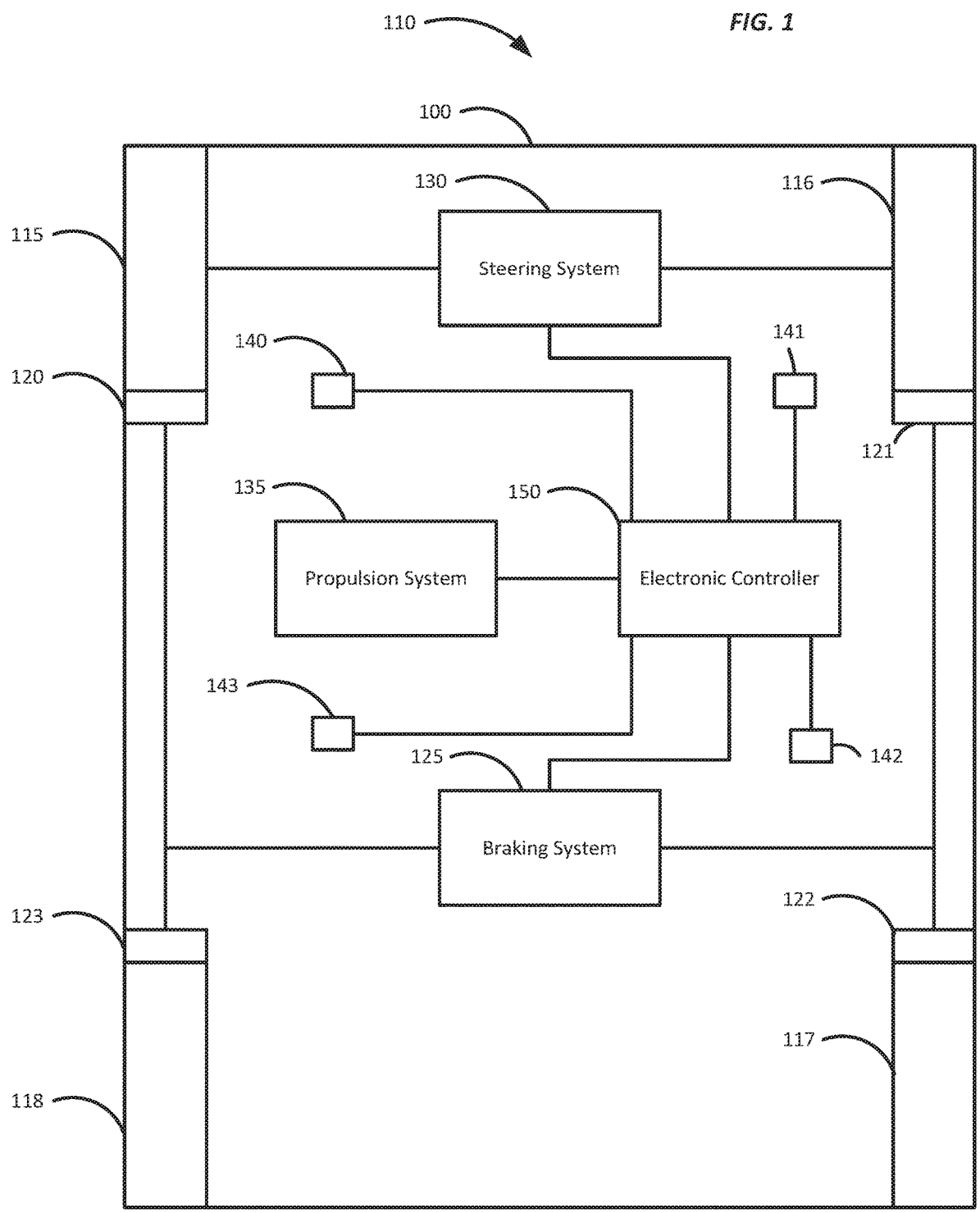
FIG. 1 illustrates a block diagram of an autonomous vehicle equipped with a control system according to one embodiment.

FIG. 1 is a block diagram illustrating a vehicle 100 equipped with a control system 110 according to one embodiment. The vehicle 100 includes one or more wheels 115-118, which each have associated brakes 120-123 controlled by a braking system 125. The vehicle 100 also includes a steering system 130, a propulsion system 135, a plurality of sensors 140-143, and an electronic controller 150. In some embodiments, the vehicle 100 is fully or semi-autonomous. In other words, the vehicle 100 is operating entirely or partially without input from a passenger or remote user of the vehicle 100.

The braking system 125 is configured to control the brakes 120-123 by, for example, actuating hydraulic or electronic components to engage or disengage the brakes 120-123 of the wheels 115-118 to slow the vehicle 100. The steering system 130 is configured to control a driving direction of the vehicle 100 by actuating at least the wheels 115-116, in this case the front wheels of the vehicle 100 (a front-wheel steering system), using a steering rod and other steering components to direct the vehicle 100 in a desired direction. In some embodiments, the steering system 130 is configured to actuate all of the wheels 115-118 (a four-wheel steering system) in order to direct the vehicle 100 in the desired direction. The propulsion system 135 includes, for example, an internal combustion engine or an electric motor and is configured to propel the vehicle 100 in the desired driving direction.

In some embodiments, the braking system 125, the steering system 130, and the propulsion system 135 are controlled by the electronic controller 150. In other embodiments, each system includes an individual electronic controller or electronic processor which is configured to receive instructions or requests from the electronic controller 150 to actuate their respective systems.

The plurality of sensors 140-143 are placed at various locations on the vehicle 100 and are configured to gather data about the surroundings of the vehicle 100. The illustrated locations of the plurality of sensors 140-143 in FIG. 1 are examples. The plurality of sensors 140-143 can be located on other portions of the vehicle 100 and a different number of sensors may be used. The plurality of sensors 140-143 can have various sensor types, such as radar sensors, light detection and ranging (LIDAR) sensors, cameras, audio sensors, vibration sensors, accelerometers, gyroscopes, and the like. It is advantageous that individual sensors of the plurality of sensors 140-143 are different types of sensors in order to collect various types of data from the surroundings of the vehicle 100. The plurality of sensors 140-143 also send metadata about the operation of each sensor, such as operating status, error code, and other data, to the electronic controller 150.

The electronic controller 150 is electrically connected to the braking system 125, the steering system 130, the propulsion system 135, and the plurality of sensors 140-143 and is configured to send instructions to and receive data from the braking system 125, the steering system 130, the propulsion system 135, and the plurality of sensors 140-143.

Figure 2:
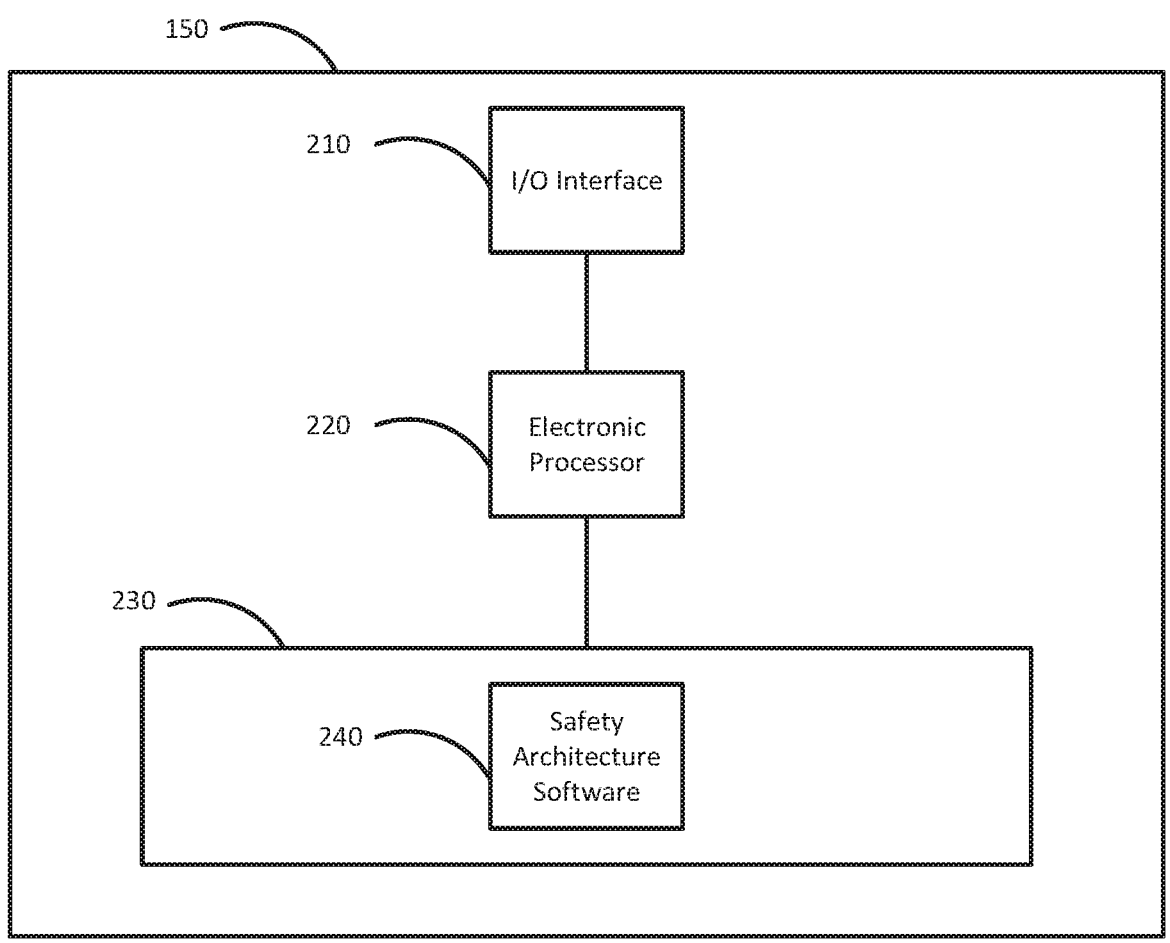
FIG. 2 illustrates an electronic controller according to one embodiment.

FIG. 2 illustrates the electronic controller 150 according to one embodiment. In the example shown, the electronic controller 150 includes an input-output interface 210, an electronic processor 220, and a memory 230 (for example, non-transitory, machine-readable memory).

The input-output interface 210 allows the electronic processor 220 to communicate with external hardware, such as the plurality of sensors 140-143. The electronic processor 220 is communicatively connected to the input-output interface 210 and the memory 230. The electronic processor 220 is configured to access the memory 230 and, among other things, execute instructions for the control system 110. The electronic processor 220 may be a microprocessor, an application-specific integrated circuit, or a similar processing circuit. The memory 230 also includes safety architecture software 240. The safety architecture software 240 is configured to receive data and metadata from the plurality of sensors 140-143 via the electronic processor 220 and, amongst other things, perform functions and methods described herein.

The safety architecture software 240 may also include a digital map or global positioning system (GPS) to allow the electronic controller 150 to determine a location of the vehicle 100 and other potential features (for example, known road signs, driving lanes, or other road or geography features) located at the location of the vehicle 100. In some embodiments, the digital map is a static map of the driving environment illustrating various features of the driving environment and is stored in the memory 230 separate from the safety architecture software 240. The digital map may be constructed in real time utilizing sensor data from the plurality of sensors 140-143 to create a localization map indicating probable locations of different static features in the driving environment. In other embodiments, this localization map is created using a combination of sensor data from the plurality of sensors 140-143 and an existing known map, such as a static map of the driving environment illustrating different features, such as driving lanes and geographic features, obtained, for example, from a remote data source by the electronic controller 150.

FIG. 3 illustrates a method 300 for controlling the vehicle 100 according to one embodiment. The method 300 includes receiving, with the electronic controller 150, sensor data from the plurality of sensors 140-143 (at block 310). For example, the electronic controller 150 may receive data from a radar sensor, from a microphone, from a LIDAR sensor, and from a camera. In some embodiments, the sensor data or each sensor input to the electronic controller 150 is assigned a weight factor by the electronic controller 150. The sensor data is stored in the memory 230 for use in determining an action to initiate as described below.

In some embodiments, the electronic controller 150 receives data from other data sources, such as the digital map or a GPS, in addition to receiving sensor data. For example, the electronic controller 150 may receive a location of the vehicle 100 in relation to known driving lanes for the driving surface the vehicle 100 is traveling (for example, the vehicle 100 is located in a right lane of a four-lane highway).

After receiving the sensor data and any other data from other data sources, the electronic controller 150 is configured to determine one or more probability hypotheses based upon the received data (at block 320). The probability hypotheses are a plurality of hypotheses about the driving environment surrounding the vehicle 100. The plurality of hypotheses is generated utilizing data fusion. One or more algorithms controlled by the safety architecture software 240 receive the inputs from the plurality of sensors 140-143 and, based upon the various inputs, generates the plurality of hypotheses, each of which illustrate a probability of different scenarios being present in the driving environment.

For example, based upon video data from a camera, radar data from a radar sensor, and LIDAR data from a LIDAR sensor, the electronic controller 150 may determine a plurality of hypotheses indicating how close an object is to the vehicle 100. One algorithm of the safety architecture software 240 may rely primarily on radar data, and the resulting hypothesis may indicate that the object is fifty feet away. A different algorithm of the safety architecture software 240 may rely primarily on video data, and the resulting hypothesis may indicate that the object is twenty feet away. Each of the hypotheses generated based upon the sensor data is saved in the memory 230 so that relevant information is not lost by pruning or discretization of hypotheses. In other words, each hypothesis is saved for later use, even if the hypothesis is not relied on to determine an action for the vehicle 100 as described below. This also allows for a combination of multiple hypotheses in order to generate a final hypothesis utilizing all probabilistic combinations of the sensor data.

In the example provided, the method also includes receiving, with the electronic controller 150, metadata associated with each of the plurality of sensors 140-143 when the sensor data is sent to the electronic controller 150 (at block 330). The metadata of each of the plurality of sensors 140-143 is analyzed to determine if any faults or limitations are present in the plurality of sensors 140-143. In some examples, the metadata includes an operating status, an error code, or other diagnostic information associated with the individual sensor sending the metadata.

In some embodiments, other data sources, such as a GPS or digital map, can also send metadata to the electronic controller 150. For example, if the vehicle 100 is located in an area with poor signal strength, the GPS could report via metadata that any location queries to the GPS may lack accuracy. Similarly for the digital map, if the location of the vehicle 100 is uncertain or unknown, the digital map may report via metadata to the electronic controller 150 that features normally accessed via the digital map may be unavailable or imprecise when being used for determining the plurality of hypotheses.

After the metadata from the plurality of sensors 140-143 is received, the electronic controller 150 determines an integrity level of at least one of the plurality of hypotheses based upon the received metadata (at block 340). For example, if the received metadata indicates that a radar sensor of the plurality of sensors 140-143 is not operating correctly, hypotheses including determinations based upon radar data may be determined to have a low integrity level. In addition, such hypotheses may be excluded from the determination of a final hypothesis. Alternatively, the probabilistic properties be recalculated based upon the incorrect operating parameters of the radar sensor. The integrity level determination can be performed for each of the plurality hypotheses in order to generate an associated integrity level for each of the plurality of hypotheses.

The determination of the integrity level, in some embodiments, may only be performed on hypotheses that do not include the sensor of the plurality of sensors 140-143 associated with the received metadata. In this way, having a single point of failure does not impact the performance of the entire system to a degree that causes system safety and performance problems.

The determined integrity level can be modified based upon a number of sensors of the plurality of sensors 140-143 that sent metadata to the electronic controller 150. For example, if a particular probability hypothesis relied on only two sensors, and one of the sensors delivers an operating status of "inoperative" or "faulty" to the electronic controller 150, the integrity level of that particular hypothesis may be reduced or downgraded because the determination now only relies on one correctly operating sensor or other data source.

The integrity level can be thought of as a confidence level in a particular hypothesis being the correct outcome for the current driving situation, and can be quantified as, for example, percentage, a number, or a particular status, such as "Confident," "Careful," and "Constrained." The integrity levels can then be compared to integrity thresholds to select a) which actions should be taken based upon the integrity level of different hypotheses and/or b) how to limit certain actions taken based upon the integrity levels.

In order to determine these integrity thresholds, the integrity level may be compared to certain international standards, such as International Organization for Standardization (ISO) 26262 or the Automotive Safety Integrity Level (ASIL), which is defined by ISO 26262. Different integrity thresholds define different levels of risk involved in driving situations. The risk is calculated based upon an expected loss or severity in case of an incident and the probability of an incident occurring.

For example, ASIL Level D is the highest classification of initial hazard (injury risk) defined by ISO 26262 and represents likely potential for collisions resulting in damage to the vehicle 100. In these cases, if the compared integrity level of a hypothesis meets the threshold for an ASIL Level D hazard, certain actions, such as hard changes in steering angle or rapid acceleration or deceleration, may be selected in order to avoid high risk collisions with objects or other dangerous driving situations. The electronic controller 150 is configured to determine an action based upon the calculated integrity level of the hypotheses (either of a single, most likely hypothesis or a final hypothesis generated using each of the plurality of hypotheses and their associated integrity levels) (at block 350).

If the integrity level is calculated such that an ASIL Level D risk is present, the actions taken may include acceleration, deceleration or braking, and steering the vehicle 100 within the physical limits of the vehicle 100 in order to reduce the risk. If the integrity level is below an ASIL Level D risk, the actions may be limited. For example, if the integrity level is below an ASIL Level D risk, the electronic controller 150 may only determine that an acceleration of the vehicle can only be 3 meters per second squared, instead of at a maximum capacity of the vehicle 100. Similarly, the electronic controller 150 may limit deceleration actions to −6 meters per second squared and may limit steering to 2 meters per second squared lateral acceleration, as the calculated integrity level for the hypothesis does not indicate that a risk requiring more drastic reactions is present.

In some embodiments, the action taken may also include limiting or prohibiting behaviors of the vehicle 100. For example, since the vehicle 100 is an autonomous vehicle, if the selected hypothesis or final hypothesis indicate that an object is traveling alongside the vehicle 100 in an adjacent lane, the electronic controller 150 may be configured to prohibit the vehicle 100 from making a lane change in the direction of the detected object until a new hypothesis with a higher integrity level indicating that the object is no longer present alongside the vehicle 100 is selected.

Additionally, the electronic controller 150 may also allow certain vehicle behaviors based upon one or more selected hypotheses or a final hypothesis. For example, if the selected hypothesis indicates an object approaching the vehicle 100 from one side of the vehicle 100, the electronic controller 150 may analyze other hypotheses and determine an action to take based upon another hypothesis, such as a) determining that the other hypothesis indicates that there is no object on the other side of the vehicle 100 and b) allowing the vehicle 100 to change lanes to avoid the approaching object.

After determining which action to take in response to a selected hypothesis of the plurality of hypotheses or a final hypothesis generated based upon each of the plurality of hypotheses, the electronic controller 150 is configured to initiate the determined action by sending a signal to a system of the vehicle 100 associated with the determined action (at block 360). For example, if a steering maneuver is determined to be the action to initiate based upon the driving situation, the electronic controller 150 may send a signal to the steering system 130 of the vehicle 100 to steer the vehicle 100 away from the risk. The sent signal may also include a limit determined by the electronic controller 150.

Various features, advantages, and embodiments are set forth in the following claims.

What is claimed is:

1. A system for controlling an autonomous vehicle, the system comprising:
   a plurality of sensors; and
   an electronic processor configured to
      receive sensor data from a plurality of sensors;
      determine a plurality of probability hypotheses based upon the sensor data;
      receive metadata from at least one sensor of the plurality of sensors;
      determine an integrity level of at least one of the plurality of probability hypotheses based upon the received metadata;
      determine at least one action based upon the determined integrity level and at least one probability hypothesis of the plurality of probability hypotheses; and
      initiate the at least one action.

2. The system of claim 1, wherein determining the integrity level includes making a modification to the at least one probability hypothesis based upon the metadata.

3. The system of claim 2, wherein the modification to the at least one probability hypothesis includes combining the probability hypothesis and at least one other probability hypothesis of the plurality of probability hypotheses in order to generate a final hypothesis.

4. The system of claim 3, wherein the final hypothesis is used to determine the at least one action.

5. The system of claim 3, wherein the final hypothesis is determined based upon each of the plurality of probability hypotheses and an associated integrity level of each of the plurality of probability hypotheses.

6. The system of claim 2, wherein the modification to the at least one probability hypothesis includes excluding the at least one probability hypothesis when determining the at least one action.

7. The system of claim 1, wherein the initiated action is at least one action selected from the group consisting of accelerating the autonomous vehicle, decelerating the autonomous vehicle, steering the autonomous vehicle, allowing a behavior of the autonomous vehicle, and prohibiting a behavior of the autonomous vehicle.

8. The system of claim 1, wherein a limit of the initiated action is determined based upon the determined integrity level.

9. The system of claim 1, wherein the determined integrity level of the at least one of the plurality of probability hypotheses is compared to a threshold level.

10. The system of claim 9, wherein the at least one action is determined based on the comparison of the determined integrity level to the threshold level.

11. A method for controlling an autonomous vehicle, the method comprising
   receiving, with an electronic processor, sensor data from a plurality of sensors;
   determining, with the electronic processor, a plurality of probability hypotheses based upon the sensor data;
   receiving, with the electronic processor, metadata from at least one sensor of the plurality of sensors;
   determining, with the electronic processor, an integrity level of at least one of the plurality of probability hypotheses based upon the received metadata;
   determining, with the electronic processor, at least one action based upon the determined integrity level and at least one probability hypothesis of the plurality of probability hypotheses; and
   initiating, with the electronic processor, the at least one action.

12. The method of claim 11, wherein determining the integrity level includes making a modification to the at least one probability hypothesis based upon the metadata.

13. The method of claim 12, wherein the modification to the at least one probability hypothesis includes combining the probability hypothesis and at least one other probability hypothesis of the plurality of probability hypotheses in order to generate a final hypothesis.

14. The method of claim 13, wherein the final hypothesis is used to determine the at least one action.

15. The method of claim 13, wherein the final hypothesis is determined based upon each of the plurality of probability hypotheses and an associated integrity level of each of the plurality of probability hypotheses.

16. The method of claim 12, wherein the modification to the at least one probability hypothesis includes excluding the at least one probability hypothesis when determining the at least one action.

17. The method of claim 11, wherein the initiated action is at least one action selected from the group consisting of accelerating the autonomous vehicle, decelerating the autonomous vehicle, steering the autonomous vehicle, allowing a behavior of the autonomous vehicle, and prohibiting a behavior of the autonomous vehicle.

18. The method of claim 11, wherein a limit of the initiated action is determined based upon the determined integrity level.

19. The method of claim 11, wherein the determined integrity level of the at least one of the plurality of probability hypotheses is compared to a threshold level.

20. The method of claim 19, wherein the at least one action is determined based on the comparison of the determined integrity level to the threshold level.

* * * * *